US012576884B2

(12) United States Patent
Dong et al.

(10) Patent No.: US 12,576,884 B2
(45) Date of Patent: Mar. 17, 2026

(54) RIGHT-OF-WAY-BASED SEMANTIC COVERAGE AND AUTOMATIC LABELING FOR TRAJECTORY GENERATION IN AUTONOMOUS SYSTEMS

(71) Applicant: GM CRUISE HOLDINGS LLC, San Francisco, CA (US)

(72) Inventors: Zisu Dong, Oakland, CA (US); Xiaohan Zhang, Kensington, CA (US); Yeojin Jung, Pittsburgh, PA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 289 days.

(21) Appl. No.: 18/403,223

(22) Filed: Jan. 3, 2024

(65) Prior Publication Data

US 2025/0214615 A1     Jul. 3, 2025

(51) Int. Cl.
*B60W 60/00* (2020.01)

(52) U.S. Cl.
CPC . *B60W 60/0011* (2020.02); *B60W 2554/4046* (2020.02)

(58) Field of Classification Search
None
See application file for complete search history.

(56) References Cited

U.S. PATENT DOCUMENTS

| | | | |
|---|---|---|---|
| 10,906,558 B1 * | 2/2021 | Hwang | B60W 60/0027 |
| 11,592,827 B1 * | 2/2023 | Lam | B60W 30/0956 |
| 11,900,224 B2 * | 2/2024 | Refaat | G06N 3/049 |

OTHER PUBLICATIONS

Y. Ban et al., "A Deep Concept Graph Network for Interaction-Aware Trajectory Prediction," 2022 International Conference on Robotics and Automation (ICRA), Philadelphia, PA, USA, 2022, pp. 8992-8998, doi: 10.1109/ICRA46639.2022.9811567. (Year: 2022).*

* cited by examiner

*Primary Examiner* — Khoi H Tran
*Assistant Examiner* — Trang Dang
(74) *Attorney, Agent, or Firm* — CANTOR COLBURN LLP

(57) ABSTRACT

Disclosed are embodiments for facilitating right-of-way-based semantic coverage and automatic labeling for trajectory generation in autonomous systems. In some aspects, an embodiment includes receiving a set of trajectories generated by a trajectory generation source, the set of trajectories generated for an autonomous vehicle (AV) interaction with a road agent; labeling a ground truth trajectory from the set of trajectories with a ground truth label; classifying each remaining trajectory of the set of trajectories as at least one of an assert trajectory or a yield trajectory; for an assert group comprising the assert trajectories, assigning an auxiliary assert label to the assert trajectory having a highest selection score; for a yield group comprising the yield trajectories, assigning an auxiliary yield label to the yield trajectory having a highest selection score; and utilizing the ground truth label, the auxiliary assert label, and the auxiliary yield label to train a trajectory generation model.

20 Claims, 10 Drawing Sheets

500

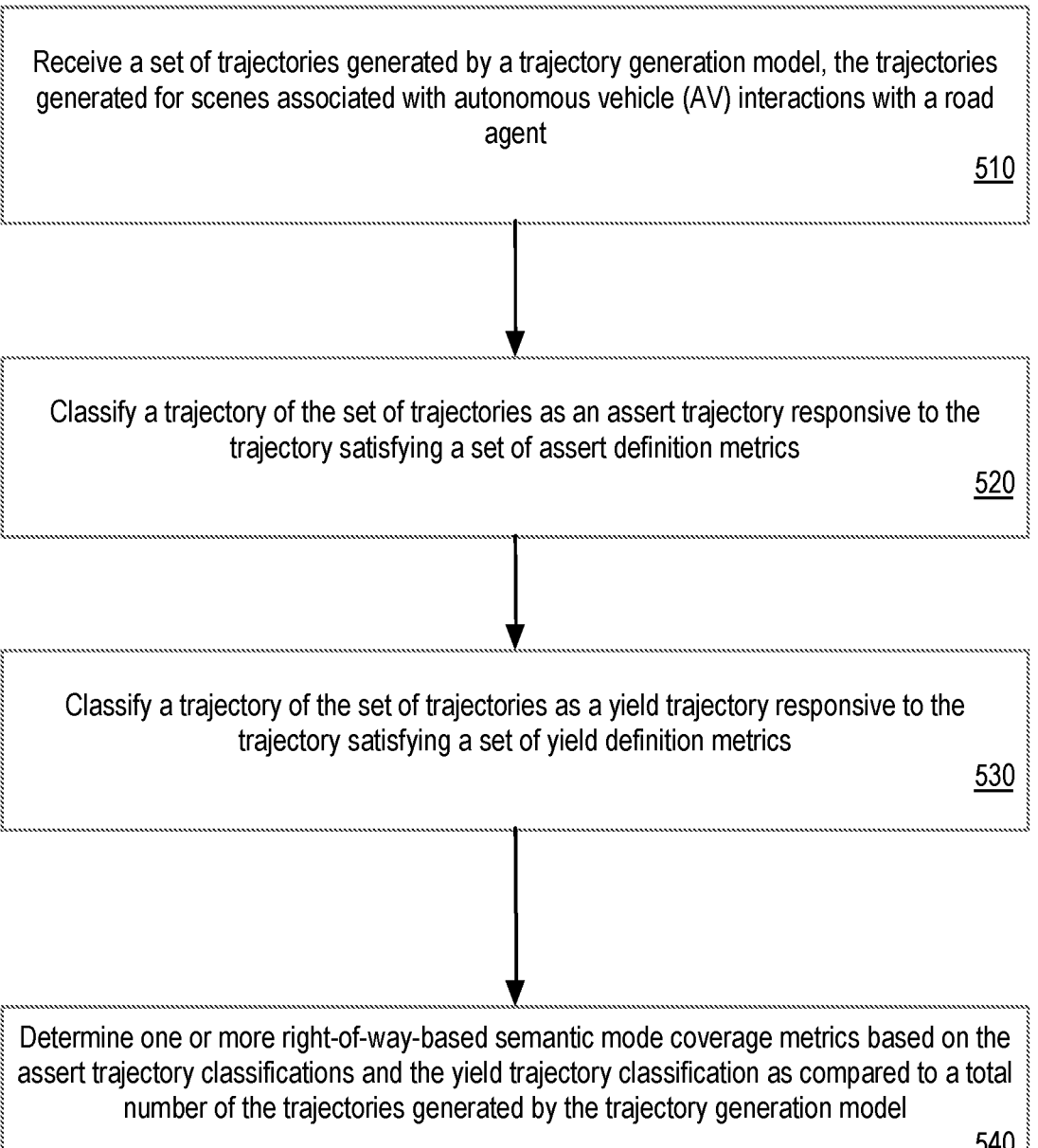

Receive a set of trajectories generated by a trajectory generation model, the trajectories generated for scenes associated with autonomous vehicle (AV) interactions with a road agent

510

Classify a trajectory of the set of trajectories as an assert trajectory responsive to the trajectory satisfying a set of assert definition metrics

520

Classify a trajectory of the set of trajectories as a yield trajectory responsive to the trajectory satisfying a set of yield definition metrics

530

Determine one or more right-of-way-based semantic mode coverage metrics based on the assert trajectory classifications and the yield trajectory classification as compared to a total number of the trajectories generated by the trajectory generation model

Figure 6:
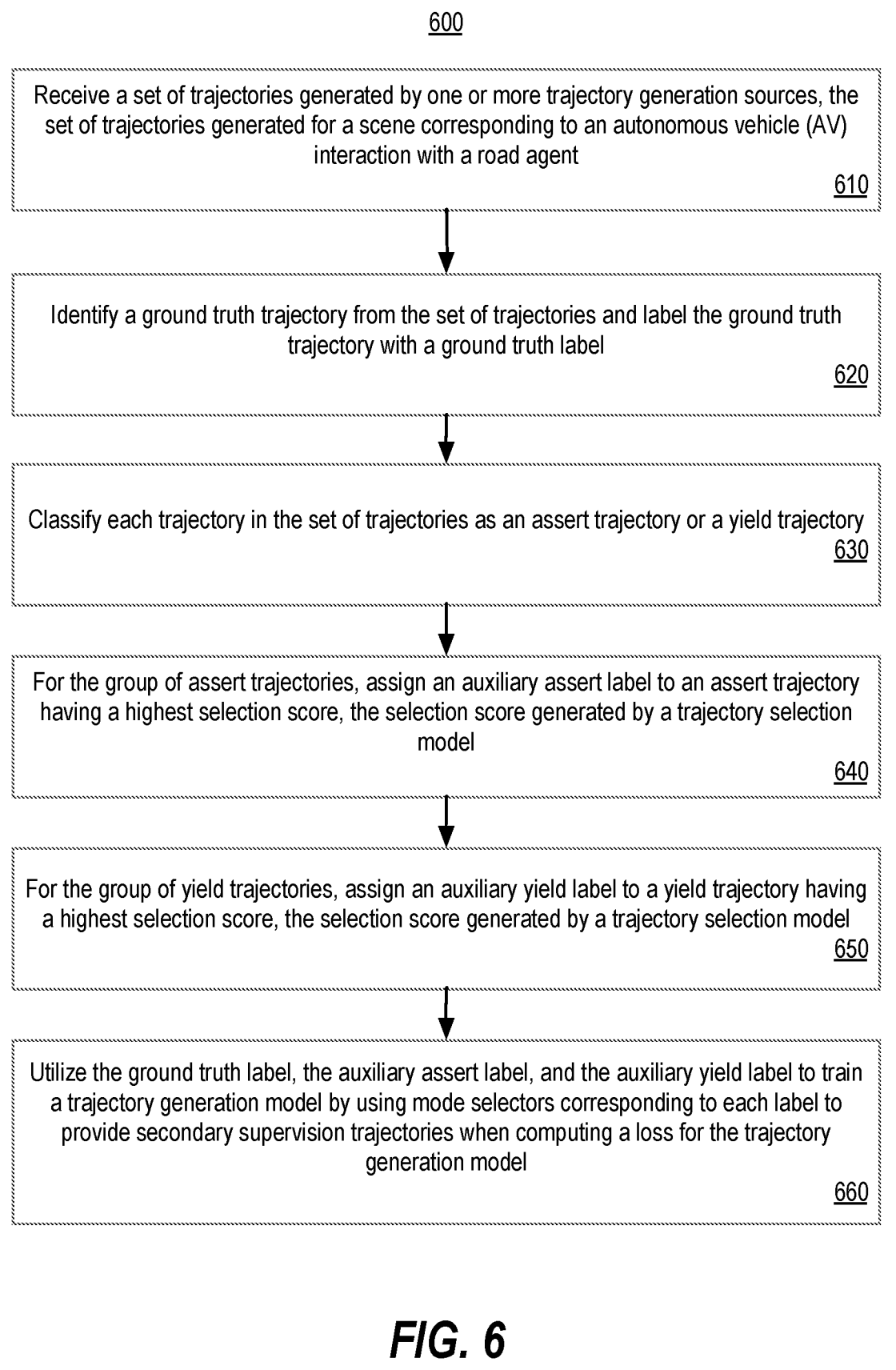

Receive a set of trajectories generated by one or more trajectory generation sources, the set of trajectories generated for a scene corresponding to an autonomous vehicle (AV) interaction with a road agent

610

Identify a ground truth trajectory from the set of trajectories and label the ground truth trajectory with a ground truth label

620

Classify each trajectory in the set of trajectories as an assert trajectory or a yield trajectory

630

For the group of assert trajectories, assign an auxiliary assert label to an assert trajectory having a highest selection score, the selection score generated by a trajectory selection model

640

For the group of yield trajectories, assign an auxiliary yield label to a yield trajectory having a highest selection score, the selection score generated by a trajectory selection model

650

Utilize the ground truth label, the auxiliary assert label, and the auxiliary yield label to train a trajectory generation model by using mode selectors corresponding to each label to provide secondary supervision trajectories when computing a loss for the trajectory generation model

RIGHT-OF-WAY-BASED SEMANTIC COVERAGE AND AUTOMATIC LABELING FOR TRAJECTORY GENERATION IN AUTONOMOUS SYSTEMS

BACKGROUND

1. Technical Field

The disclosure generally relates to the field of processing systems and, more specifically, to right-of-way-based semantic coverage and automatic labeling for trajectory generation in autonomous systems.

2. Introduction

Autonomous vehicles, also known as self-driving cars, driverless vehicles, and robotic vehicles, may be vehicles that use multiple sensors to sense the environment and move without a human driver. An example autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

BRIEF DESCRIPTION OF THE DRAWINGS

The various advantages and features of the disclosed technology will become apparent by reference to specific embodiments illustrated in the appended drawings. A person of ordinary skill in the art will understand that these drawings show some examples of the disclosed technology and would not limit the scope of the disclosed technology to these examples. Furthermore, the skilled artisan will appreciate the principles of the disclosed technology as described and explained with additional specificity and detail through the use of the accompanying drawings in which:

FIG. 5 illustrates an example method for generating right-of-way-based semantic coverage metrics in autonomous systems, in accordance with embodiments herein;

FIG. 6 illustrates an example method implementing right-of-way-based semantic mode automatic labeling for trajectory generation in autonomous systems, in accordance with embodiments herein;

DETAILED DESCRIPTION

Figure 1:
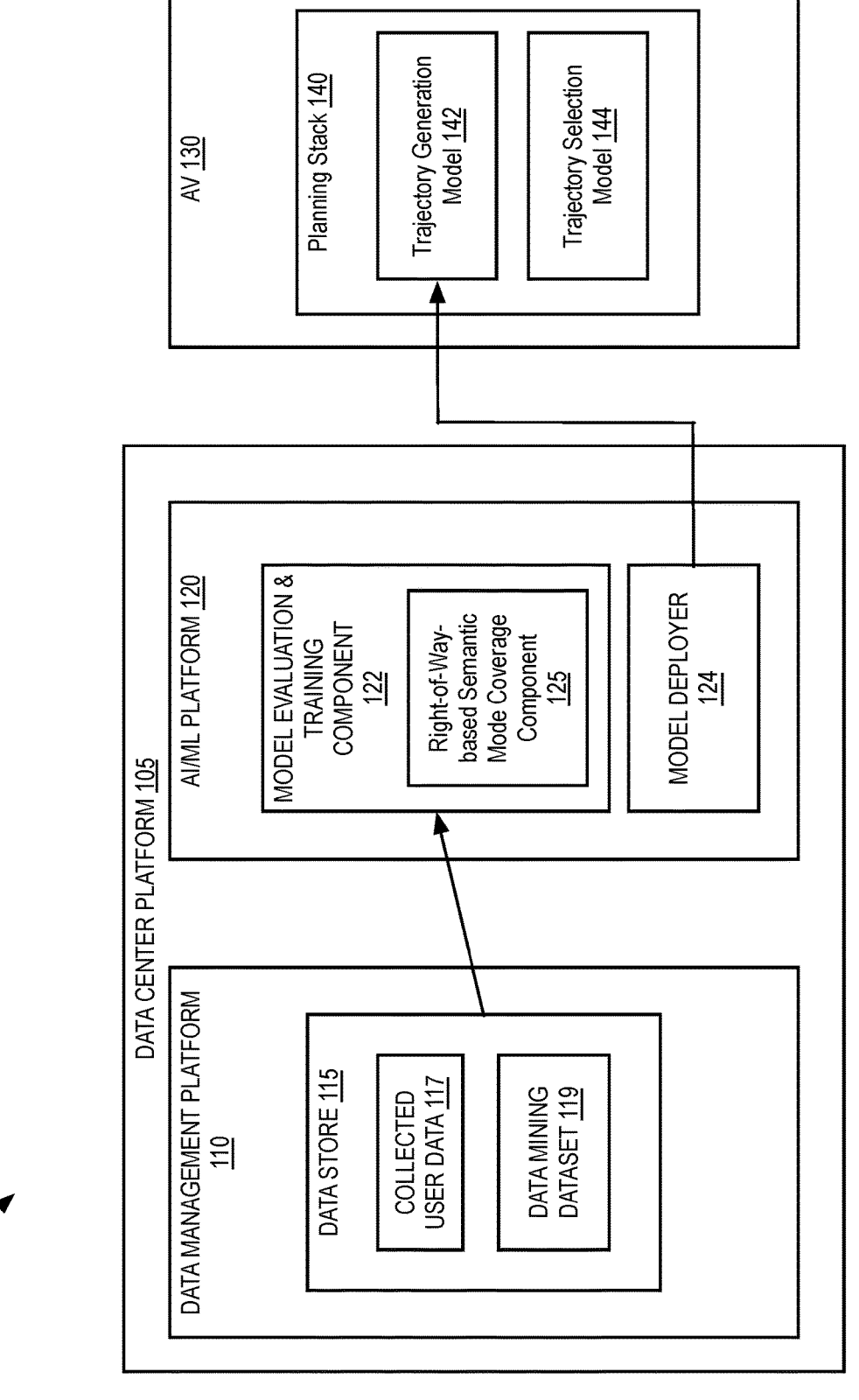
FIG. 1 is a block diagram illustrating an example system for right-of-way-based semantic coverage and automatic labeling for trajectory generation in autonomous systems, in accordance with embodiments herein.

The detailed description set forth below is intended as a description of various configurations of the subject technology and is not intended to represent the configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Autonomous vehicles (AVs), also known as self-driving cars, driverless vehicles, and robotic vehicles, can be implemented by companies to provide self-driving car services for the public, such as taxi or ride-hailing (e.g., ridesharing) services. The AV can navigate about roadways without a human driver based upon sensor signals output by sensor systems deployed on the AV. AVs may utilize multiple sensors to sense the environment and move without a human driver. An example AV can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

AVs can utilize one or more trained machine learning (ML)-based models that autonomously control and/or operate the vehicle. The trained model(s) can utilize the data and measurements captured by the sensors of the AV to identify, classify, and/or track objects (e.g., vehicles, people, stationary objects, structures, animals, etc.) within the AV's environment. The model(s) utilized by the AV may be trained using any of various suitable types of learning, such as deep learning (also known as deep structured learning). Deep learning is part of a broader family of machine learning methods based on artificial neural networks with representation learning. The learning can be supervised, semi-supervised, or unsupervised, and may be trained using real-world image data and/or image data generated in a simulated environment that have been labeled according to "correct" outputs of one or more perception functions (e.g., segmentation, classification, and/or tracking) of the AV.

As part of autonomously controlling and operating the vehicle, AVs can utilize one or more trajectory planning models, including trajectory generation models, for generation of sets of candidate trajectories that downstream systems of the AV may select from for purposes of implementing on-road navigation behavior of the AV. The downstream trajectory selection can only be as strong as the best generated trajectory among the set of candidate trajectories. In some cases, trajectory planning models of AVs may not generate a full set of candidate trajectories that cover a variety of different semantic modes. A semantic mode as discussed herein may refer to the behavior of the AV and can include right-of-way-based semantic modes, such as assert (e.g., overtake) and yield (e.g., follow behind) trajectories of the AV. Right-of-way as discussed herein may refer to who has the legal right to go first on the road. If the AV or another driver fails to yield the right of way, they risk colliding with each other, cyclists, or pedestrians. A lack of full right-of-way semantic coverage as noted above may lead to sub-optimal trajectories being selected for the AV's on-road behavior. One challenge to providing full semantic mode coverage by trajectory planning models is that such models have not provided definitions for semantic coverage and have not considered such semantic coverage as part of supervision during training of the trajectory planning models.

Embodiments herein address the above-noted problems experienced with semantic coverage of trajectory generation in autonomous systems by providing right-of-way-based semantic coverage and automatic labeling for trajectory generation in autonomous systems. In one example, right-of-way semantic mode coverage is provided by first adopting metrics to measure semantic mode coverage of generated trajectories, and second by automatically labeling (autolabeling) trajectories from sources other than a ground truth as part of additional supervision in training the trajectory planning models.

With respect to adopting metrics to measure semantic mode coverage of generated trajectories, definitions of right-of-way for assert trajectory and yield trajectory are identified. The metrics are computed to measure a performance of a trajectory generation system, such as a trajectory generation model, in providing semantic mode coverage by its generated trajectories. The main metrics used may include a percentage of assert and yield trajectories, respectively, provided within a set of generated trajectories by the trajectory generation system, per tick. Another metric may include whether there are at least one of each assert and yield trajectories in the set of generated trajectories, per tick.

In embodiments herein, the semantic mode coverage metrics can be computed by first identifying road agents having potential interactions with the AV in a scene. Road agents may refer to vehicles other than the AV in a scene captured by the AV at an operational "tick" of the AV. (As used herein, a tick may refer to the atomic unit used to define system time in the computing system.) Various criteria (e.g., is not AV, slowly or nor moving, classified as vehicle, in lane with AV, not in parking region, close to AV, etc.) may be utilized to identify the candidate road agents at each tick, and a single road agent may be selected from the candidates based on one or more of the criteria (e.g., one with smallest angle to the AV, etc.). Then, all candidate trajectories predicted by the trajectory generation system with respect to the AV and the selected road agent are then categorized as either assert or yield trajectories. Based on the categorization, the metrics can be computed to quantify the right-of-way-based semantic mode coverage provided by the trajectory generation system.

With respect to autolabeling trajectories to provide additional supervision in training the trajectory generation model, embodiments herein introduce the use of right-of-way-based semantic mode labels for purposes of additional supervision when training the trajectory generation model. The right-of-way-based semantic mode labels can include both assert and yield labels for trajectories. In one embodiment, trajectories labeled with an assert label and trajectories labeled with a yield label are included, along with a ground truth labeled trajectory, as part of a set of trajectories used to train the trajectory generation model. The set of trajectories (including at least the ground truth trajectory, assert trajectory, and yield trajectory) are fed into three mode (e.g., trajectory) selectors. The first mode selector selects a trajectory closest to a ground truth label, the second mode selector selects a trajectory closest to an auxiliary assert label, and the third mode selector selects a trajectory closest to an auxiliary yield label. Losses are computed individually for each selected trajectory, and a final loss utilized for training of the trajectory generation model is the sum of all three losses. In this way, training of the trajectory generation model enforces diversity in terms of right-of-way-based semantic modes) on a set of generated trajectories at each tick (e.g., so that the set contains both assert and yield modes).

The metrics to measure right-of-way-based semantic mode coverage and the right-of-way-based autolabeling of multiple trajectories used for training of trajectory generation models of embodiments herein can provide a number of technical advantages. For example, the metrics to measure right-of-way-based semantic mode coverage can help engineers understand a model's ability to generation right-of-way-based trajectories (e.g., both assert and yield trajectories) to cover different semantic modes when the AV is interacting with other road agents. Furthermore, the right-of-way-based autolabeling of multiple trajectories used for training can improve diversity of candidate AV behaviors in operational planning of an AV.

Although some embodiments herein are described as operating in an AV, other embodiments may be implemented in an environment that is not an AV, such as, for example, other types of vehicles (human operated, driver-assisted vehicles, etc.), air and terrestrial traffic control, radar astronomy, air-defense systems, anti-missile systems, marine radars to locate landmarks and other ships, aircraft anti-collision systems, ocean surveillance systems, outer space surveillance and rendezvous systems, meteorological precipitation monitoring, altimetry and flight control systems, guided missile target locating systems, ground-penetrating radar for geological observations, and so on. Furthermore, other embodiments may be more generally implemented in any artificial intelligence and/or machine learning-type environment. The following description discusses embodiments as implemented in an automotive environment, but one skilled in the art will appreciate that embodiments may be implemented in a variety of different environments and use cases. Further details of the right-of-way-based semantic coverage and automatic labeling for trajectory generation in autonomous systems of embodiments herein are further described below with respect to FIGS. 1-9.

FIG. 1 is a block diagram illustrating an example system 100 for right-of-way-based semantic coverage and automatic labeling for trajectory generation in autonomous systems, in accordance with embodiments herein. In one embodiment, system 100 implements a data center platform 105 communicably coupled to an AV 130 for providing the data mining on an edge platform using repurposed neural network models in autonomous systems, as described further herein. The data center platform 105 of FIG. 1 can be, for example, part of a data center that is cloud-based or otherwise. In other examples, the AV 130 can be part of an AV or a human-operated vehicle having an advanced driver assistance system (ADAS) that can utilize various sensors including radar sensors.

In one embodiment, system 100 can communicate over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.). In one embodiment, system 100 can be implemented using a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth.

The system 100 may be part of a platform for managing a fleet of AVs and AV-related services. The platform can include the data center platform 105, which can send and receive various signals to and from an AV 130. These signals can include sensor data captured by the sensor systems of the AV 130, roadside assistance requests, software updates, ridesharing pick-up and drop-off instructions, and so forth. In some examples, the data center platform 105 may also support a ridesharing service, a delivery service, a remote/roadside assistance service, street services (e.g., street mapping, street patrol, street cleaning, street metering, parking reservation, etc.), and the like. In some embodiments, the system 100 may be implemented in the AV itself or may be implemented in a server computing device.

In this example, the system 100 includes a data center platform 105 hosting one or more of a data management platform 110 and an Artificial Intelligence/Machine Learning (AI/ML) platform 120, among other systems, that are communicably coupled to an AV 130.

Data management platform 110 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. In one embodiment, the data management platform includes a data store 115 that stores collected user data 117 collected, for example, from the user (e.g., as part of setting up a user profile) and/or from operation of one or more AVs. In some embodiments, data store 115 may also include a data mining dataset 119 that stores data that is mined for use in training and/or evaluation of ML models.

The AI/ML platform 120 can provide an infrastructure for training and evaluating machine learning algorithms for operating the AV, and other platforms and systems. In one embodiment, the AI/ML platform 120 of system 100 may include a model evaluation and training component 122, and/or a model deployer 124. Using the model evaluation and training component 122, and/or the model deployer 124, data scientists can prepare data sets from the data management platform 110; select, design, and train machine learning models 142, 144; evaluate, refine, and deploy the models 142, 144; maintain, monitor, and retrain the models 142, 144; and so on.

As part of autonomously controlling and operating the vehicle, an AV 130 can utilize a planning stack 140 to determine how to maneuver or operate the AV 130 safely and efficiently in its environment. As part of its functions, the planning stack 140 may generate and select trajectories for purposes of implementing on-road navigation behavior of the AV 130. The planning stack 140 may include one or more ML-based models trained and deployed from AI/ML platform 120 using model evaluation and training component 122 and model deployer 124. The ML-based models deployed to planning stack 140 can include, but are not limited to, a trajectory generation model 142 and a trajectory selection model 144.

The trajectory generation model 142 can determine multiple sets of one or more trajectories that the AV 130 can perform (e.g., go straight at a specified speed or rate of acceleration, including maintaining the same speed or decelerating; turn on the left blinker, decelerate if the AV 130 is above a threshold range for turning, and turn left; turn on the right blinker, accelerate if the AV 130 is stopped or below the threshold range for turning, and turn right; decelerate until completely stopped and reverse; etc.). The trajectory selection model 144 can receive the generated set of trajectories from trajectory generation model 142 and select a trajectory to meet changing road conditions and events.

As discussed herein, the trajectory selection by trajectory selection model 144 can only be as strong as the best generated trajectory among the set of candidate trajectories. In some cases, trajectory generation model 142 may not generate a full set of candidate trajectories that cover a variety of different semantic modes. A semantic mode as discussed herein may refer to the behavior of the AV 130 and can include right-of-way-based semantic modes such as assert (e.g., overtake) and yield (e.g., follow behind) trajectories of the AV 130. This lack of full semantic coverage may lead to sub-optimal trajectories being selected for the AV's 130 on-road behavior.

Embodiments herein address the above-noted problems experienced with semantic coverage of trajectory generation in autonomous systems by providing right-of-way-based semantic coverage and automatic labeling for trajectory generation in autonomous systems. In one embodiment, the right-of-way-based semantic mode coverage component 125 is implemented as part of model evaluation and training component 122 to provide the right-of-way-based semantic coverage and automatic labeling for trajectory generation. The right-of-way-based semantic mode coverage component 125 can provide for identification and calculation of metrics to measure semantic mode coverage of generated trajectories, and also implement automatic labeling (autolabeling) of trajectories from sources other than a ground truth as part of additional supervision in training of the trajectory generation model 142. Further details of the right-of-way-based semantic coverage and automatic labeling for trajectory generation in autonomous systems in autonomous systems are provided below with respect to FIGS. 2-9.

Figure 2:
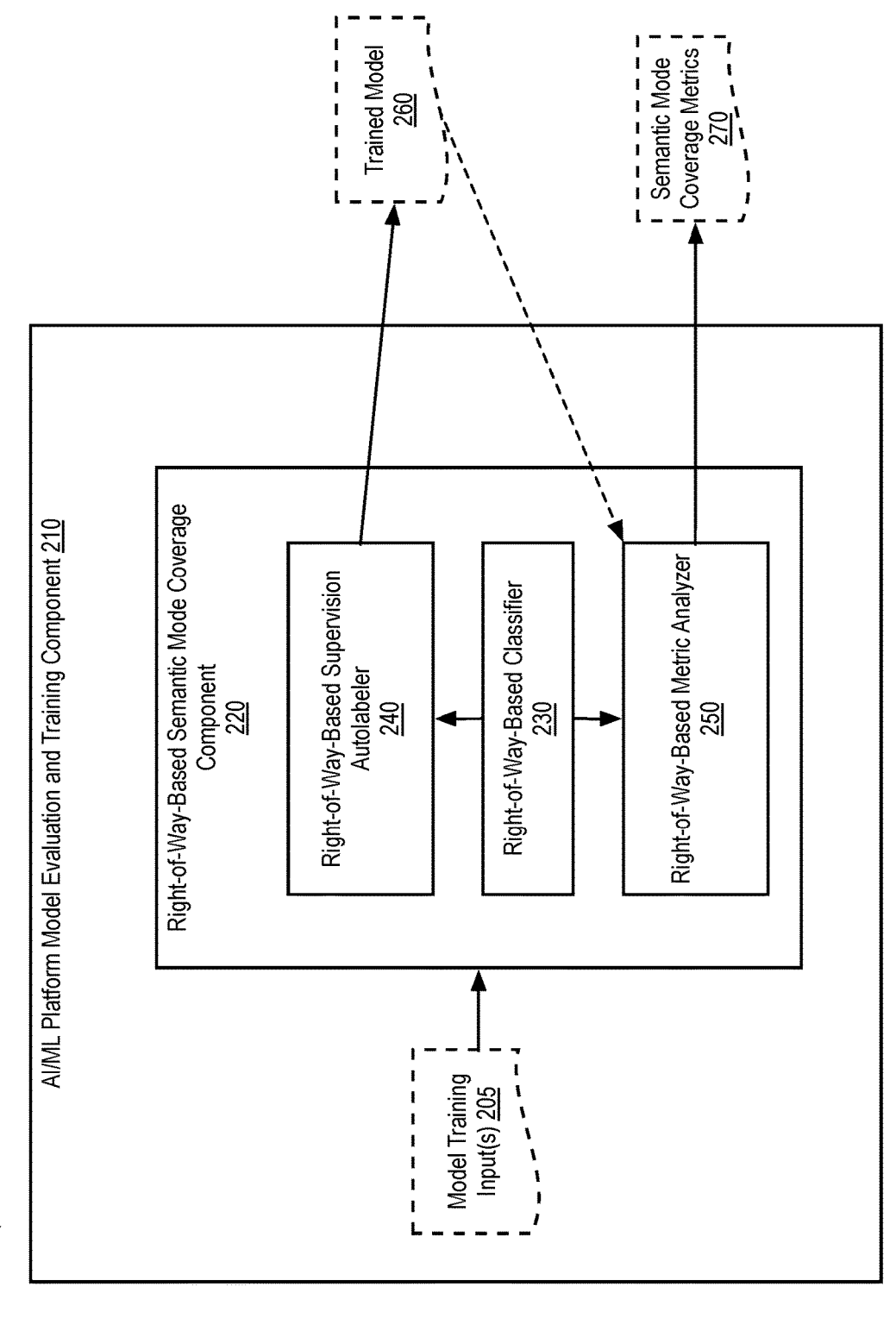
FIG. 2 is a block diagram of an artificial intelligence (AI)/machine learning (ML) platform implementing right-of-way-based semantic coverage and automatic labeling for trajectory generation in autonomous systems, in accordance with embodiments herein.

FIG. 2 is a block diagram of an AI/ML platform 200 implementing right-of-way-based semantic coverage and automatic labeling for trajectory generation in autonomous systems, in accordance with embodiments herein. In one embodiment, AI/ML platform 200 is the same as AI/ML platform 120 described with respect to FIG. 1. AI/ML platform 200 may include an AI/ML platform model evaluation and training component 210, which may be the same as model evaluation and training component 122 described with respect to FIG. 1. AI/ML platform model evaluation and training component 210 can include a right-of-way-based semantic mode coverage component 220 to enable and support right-of-way-based semantic coverage and automatic labeling for trajectory generation of embodiments herein.

In one embodiment, the right-of-way-based semantic mode coverage component 220 can provide for identification and calculation of metrics to measure semantic mode coverage of generated trajectories, and also implement automatic labeling (autolabeling) of trajectories from sources other than a ground truth as part of additional supervision in training of a trajectory generation model. The right-of-way-based semantic mode coverage component 125 can include a right-of-way-based classifier 230, a right-of-way-based supervision autolabeler 240, and a right-of-way-based metric analyzer 250 to provide the above-noted capabilities.

With respect to adopting metrics to measure semantic mode coverage of generated trajectories, the right-of-way-based classifier 230 and the right-of-way-based metric analyzer 250 can both be utilized to identify and implement definitions of right-of-way for assert trajectories and yield trajectories (right-of-way semantic modes), and calculate metrics around those right-of-way semantic modes. In some implementations, there may be different types of interactions with other road agents where an assert trajectory or a yield trajectory may result. For example, the different types of interactions may include overtake interactions or commit interactions.

With respect to overtake interactions, these may involve a scene where the AV is approaching another vehicle that is in front of the AV (referred to herein as a lead vehicle). If the AV is traveling at a higher rate of speed than the lead vehicle, the AV should determine whether it overtakes the lead vehicle (assert trajectory or overtake assert trajectory) or follows behind the lead vehicle (yield trajectory or overtake yield trajectory).

Figure 3A:
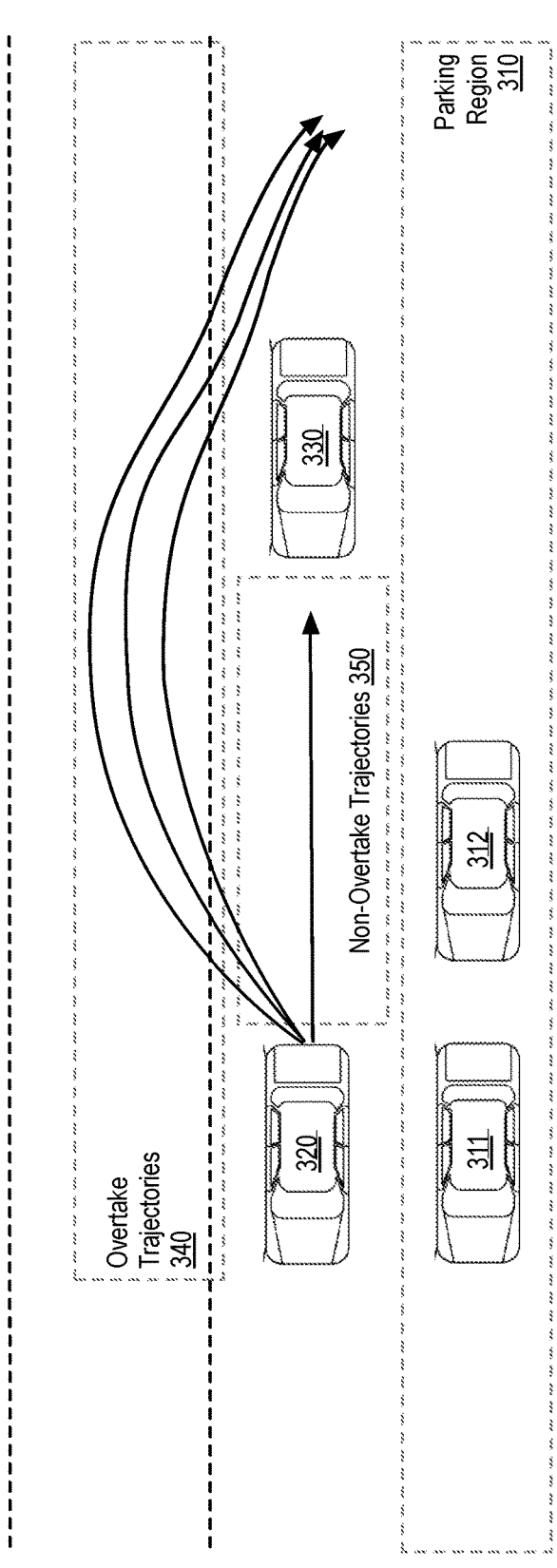
FIG. 3A is a schematic illustrating an example overtake interaction scene, in accordance with embodiments herein.

FIG. 3A is a schematic illustrating an example overtake interaction scene 300, in accordance with embodiments herein. As shown in overtake interaction scene 300, an AV 320 is approaching a lead vehicle 330. Other vehicles 311, 312 may also be detected by the AV 320 and determined to be in a parking region 310, and thus are not considered in terms of the overtake interaction assessment. Any trajectories generated by the AV that cause the AV to overtake (go around) the lead vehicle 330 may be categorized as an assert trajectories 340 and can be considered assert trajectories or overtake assert trajectories herein. Trajectories generated by the AV that cause the AV to follow behind the lead vehicle 330 may be categorized as non-overtake trajectories 350 and can be considered yield trajectories or overtake yield trajectories herein.

With respect to commit interactions, these may involve a scene where a future trajectory of the AV may intersect with a future trajectory of a road agent, such as another vehicle. In this type of interaction, a commit region should be identified where the future AV trajectory is overlaid with the future trajectory of the road agent. The intersecting portion of the two trajectories is identified as the commit region. If the AV arrives at the commit region first, then the trajectory of the AV can be categorized as an assert trajectory (or a commit assert trajectory). If the road agent arrives at the commit region first, then the trajectory of the AV can be categorized as a yield trajectory (or a commit yield trajectory).

Figure 3B:
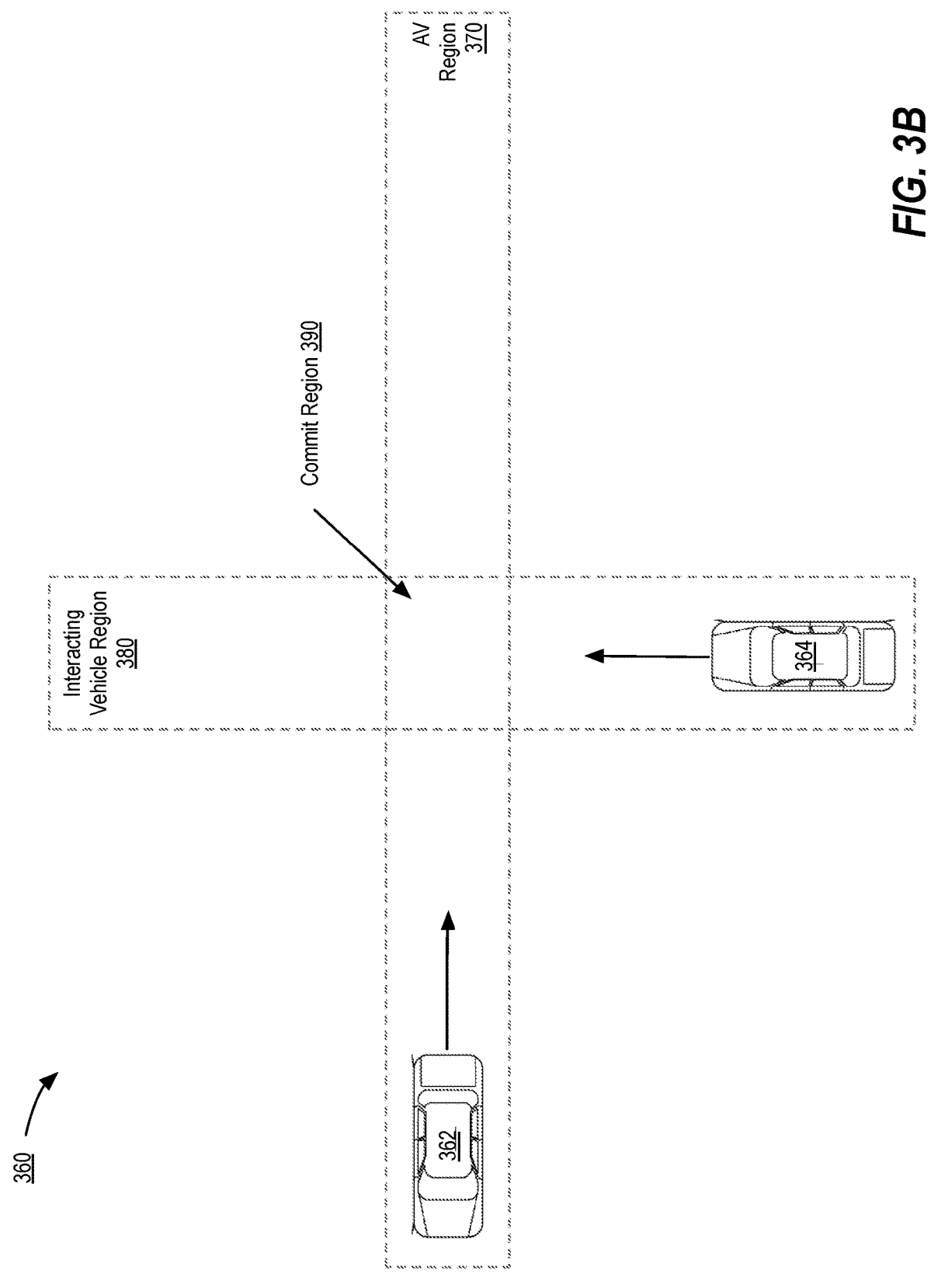
FIG. 3B is a schematic illustrating an example commit interaction scene, in accordance with embodiments herein.

FIG. 3B is a schematic illustrating an example commit interaction scene 360, in accordance with embodiments herein. As shown in commit interaction scene 360, an AV 362 is approaching another interacting vehicle 364 (road agent). The AV is determined to have a future trajectory shown as AV region 370, while the interacting vehicle 364 is determined to have a future trajectory shown as interaction vehicle region 380. The intersecting portion of those two regions 370, 380 is defined as the commit region 390. If the AV 362 arrives at the commit region 390 first, then the trajectory of the AV 362 can be categorized as an assert trajectory (or a commit assert trajectory). If the interacting vehicle 364 arrives at the commit region 390 first, then the trajectory of the AV 362 can be categorized as a yield trajectory (or a commit yield trajectory).

Referring back to FIG. 2, the right-of-way-based classifier 230 can utilize the definitions of right-of-way semantic modes (e.g., assert trajectories and yield trajectories) of the various different types of AV interactions (overtake, commit, etc.) to determine semantic mode coverage of generated trajectories by a trajectory generation model. Various metrics can be utilized to identify an assert or yield trajectory. With respect to overtake interactions, a speed difference between the AV and the lead vehicle can be assessed to identify an overtake assert or an overtake yield. With respect to commit interactions, determination of which vehicle or agent arrives to a commit region first can be utilized to identify a commit assert or a commit yield.

When assessing a trajectory generation model, the right-of-way-based classifier 230 can receive outputs of the trajectory generation model, such as a trained model 260, where the outputs are the generated trajectories determined by the model 260. In embodiments herein, the semantic mode coverage metrics are determined by first having the right-of-way-based classifier 230 identify road agents having potential interactions with the AV in a scene. Various criteria (e.g., is not AV, slowly or nor moving, classified as vehicle, in lane with AV, not in parking region, close to AV, etc.) may be utilized to identify the candidate road agents at each tick, and a single road agent may be selected from the candidates based on one or more of the criteria (e.g., one with smallest angle to the AV, etc.). The right-of-way-based classifier 230 can then determine, for each trajectory in the set, whether the trajectory can be categorized as an assert trajectory or a yield trajectory, per the discussion above. Each generated trajectory can be labeled separately by the right-of-way-based classifier 230. In some embodiments, any trajectories determined to be colliding trajectories can be filtered out before categorizing the trajectories.

Using the trajectory classifications provided by right-of-way-based classifier 230, the right-of-way-based metric analyzer 250 can compute semantic mode coverage metrics 270 to measure performance of the trajectory generation model 260 in terms of the model's semantic mode coverage by its generated trajectories. One example semantic mode coverage metric includes determining a percentage of assert and yield trajectories, respectively, provided within a set of generated trajectories by the trajectory generation system, per tick. Another example semantic mode coverage metric includes determining whether there are at least one of each assert and yield trajectories in the set of generated trajectories, per tick.

In one embodiment, the semantic mode coverage metrics 270 generated by right-of-way-based metric analyzer 250 can be used to assess semantic mode coverage of a trained trajectory generation model, such as trained model 260, to determine if the right-of-way-based semantic mode coverage by the trained model 260 is sufficient. In some embodiments, the semantic mode coverage metrics 270 can be utilized to decide whether further evaluation and training of the trained model 260 should be performed to improve diversity of right-of-way-based semantic mode coverage by the model 260. In this case, the right-of-way-based supervision autolabeler 240 can be utilized to provide additional supervision using multiple trajectory labels during training of a trajectory generation model, as described further below.

With respect to autolabeling trajectories to provide additional supervision in training the trajectory generation model, embodiments herein introduce the use of right-of-way-based semantic mode labels for purposes of additional supervision when training the trajectory generation model. In one embodiment, the right-of-way-based supervision autolabeler 240 can receive model training inputs 205 for use in training a trajectory generation model. The model training inputs 205 may include trajectories generated by various sources as label candidates. The various sources may include a trajectory generation model, heuristics-based generator, a non-convex solver and costing source, and other trajectory generation sources. For each interaction (overtake, commit) tick, the logged trajectories for that tick are assessed and labeled by right-of-way-based classifier 230 with an assert or yield label. In addition, the trajectory that from the set of trajectories that was selected for downstream AV control implementation is labeled with a ground truth label. The classified trajectories are then provided to the right-of-way-based supervision autolabeler 240 to select auxiliary label trajectories, as discussed below.

A trajectory selection score associated with each labeled trajectory for the interaction tick is then determined by the right-of-way-based supervision autolabeler 240. The trajectory selection score may be a score assigned to the trajectory by a trajectory selection model as part of processing a set of trajectories to select a single trajectory to pass on for purposes of implementing AV on-road behavior. For each group of labeled trajectories, a trajectory having a top score is selected an auxiliary label for that group. For example, among the trajectories classified as assert trajectories, the trajectory associated with a highest score is selected as the auxiliary assert label trajectory. Similarly, among the trajectories classified as yield trajectories, the trajectory associated with a highest score is selected as the auxiliary yield label trajectory. In some embodiments, the classifications may be further divided into overtake assert/yield trajectories and commit assert/yield trajectories, with a top labeled trajectory selected for each category. In one embodiment, the right-of-way-based supervision autolabeler then utilizes the selected trajectories labeled with the ground truth label, the auxiliary assert label, and the auxiliary yield label to train the trajectory generation model.

Figure 4:
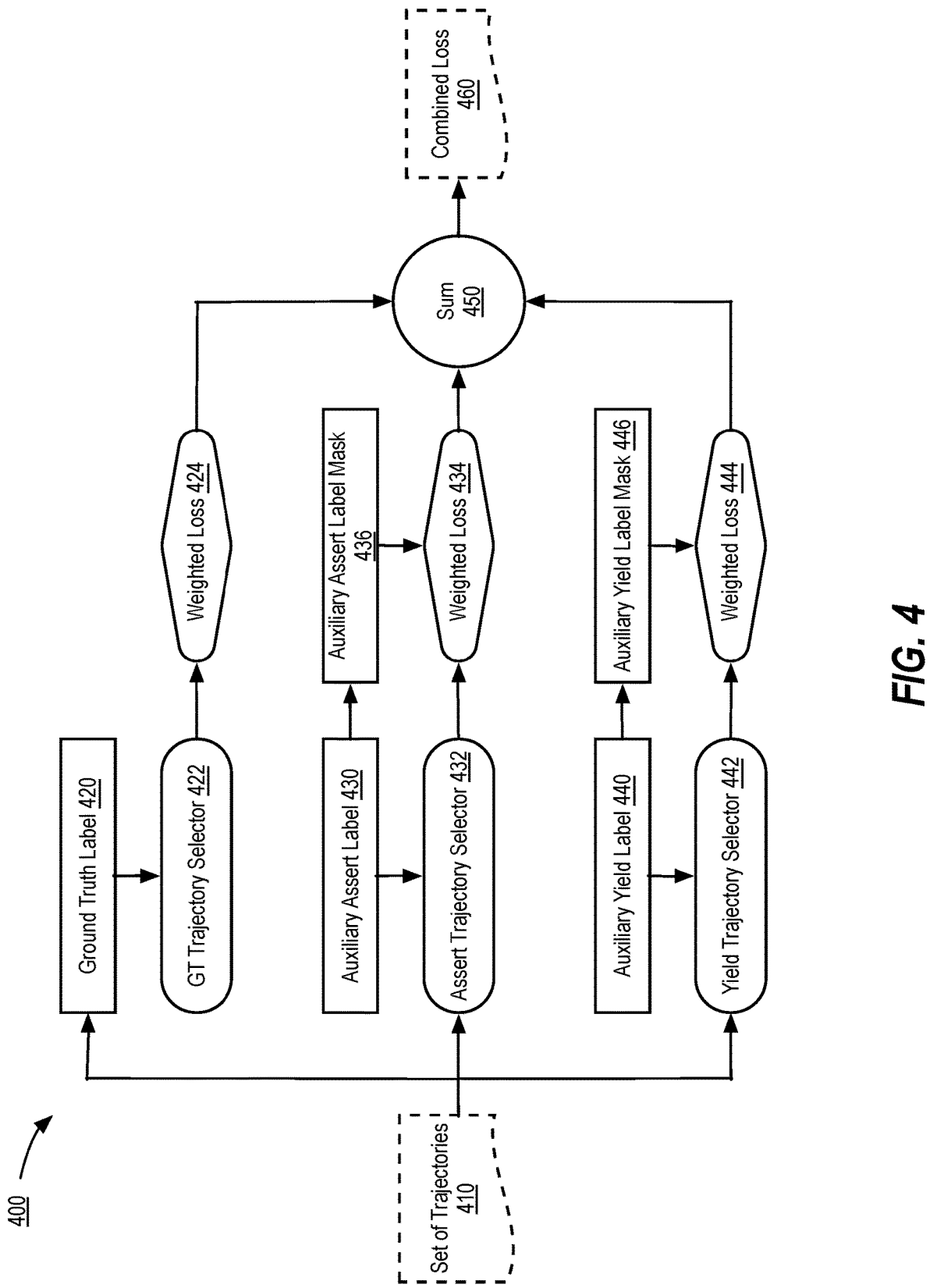
FIG. 4 is a block diagram depicting a right-of-way-based supervision autolabeler implementing loss computation for right-of-way-based multi-label training, in accordance with embodiments herein.

FIG. 4 is a block diagram depicting a right-of-way-based supervision autolabeler 400 implementing loss computation for right-of-way-based multi-label training, in accordance with embodiments herein. The set of trajectories 410 (including the ground truth trajectory, assert trajectory, and yield trajectory) are fed into three mode (e.g., trajectory) selectors, a GT (ground truth) trajectory selector 422, an assert trajectory selector 432, and a yield trajectory selector 442. The GT trajectory selector 422 selects a trajectory closest to a ground truth label 420, the assert trajectory selector 432 selects a trajectory closest to an auxiliary assert label 430, and the yield trajectory selector 442 selects a trajectory closest to an auxiliary yield label 440. An auxiliary assert label mask 436 and an auxiliary yield label mask 446 can be applied to exclude empty labels for normalization purposes.

Weighted losses 424, 434, 444 are computed individually for each selected trajectory and summed 450 together to generate a final combined loss 460. In one embodiment, the weighted losses 424, 434, 444 may be weighted Huber losses. The final combined loss 460 is utilized for training of the trajectory generation model. In this way, training of the trajectory generation model enforces diversity in terms of right-of-way-based semantic modes on a set of generated trajectories at each tick (e.g., so that the set contains both assert and yield modes).

FIG. 5 illustrates an example method 500 for generating right-of-way-based semantic coverage metrics in autonomous systems, in accordance with embodiments herein. Although the example method 500 depicts a particular sequence of operations, the sequence may be altered without departing from the scope of the disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some embodiments, the method 500 includes block 510 where a set of trajectories generated by a trajectory generation model are received. In one embodiment, the set of trajectories are generated for scenes associated with AV interactions with a road agent. The, at block 520, a trajectory of the set of trajectories is classified as an assert trajectory responsive to the trajectory satisfying a set of assert definition metrics.

Subsequently, at block 530, a trajectory of the set of trajectories is classified as a yield trajectory responsive to the trajectory satisfying a set of yield definition metrics. Lastly, at block 540, one or more right-of-way-based semantic mode coverage metrics are determined based on the assert trajectory classifications and the yield trajectory classification as compared to a total number of the trajectories generated by the trajectory generation model.

FIG. 6 illustrates an example method 600 implementing right-of-way-based semantic mode automatic labeling for trajectory generation in autonomous systems, in accordance with embodiments herein. Although the example method 600 depicts a particular sequence of operations, the sequence may be altered without departing from the scope of the disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some embodiments, the method 600 includes block 610 where a set of trajectories generated by one or more trajectory generation sources is received. In one embodiment, the set of trajectories is generated for a scene corresponding to an AV interaction with a road agent. Then, at block 620, a ground truth trajectory is identified from the set of trajectories. In one embodiment, the ground truth trajectory is labeled with a ground truth label. At block 630, each trajectory in the set of trajectories is classified as an assert trajectory or a yield trajectory.

Subsequently, at block 640, for the group of assert trajectories, an auxiliary assert label is assigned to an assert trajectory having a highest selection score. In one embodiment, the selection score is generated by a trajectory selection model. At block 650, for the group of yield trajectories, an auxiliary yield label is assigned to a yield trajectory having a highest selection score. Lastly, at block 660, the ground truth label, the auxiliary assert label, and the auxiliary yield label are utilized to train a trajectory generation model. In one embodiment, the trajectory generation model is trained by using mode selectors corresponding to each label to provide secondary supervision trajectories when computing a loss for the trajectory generation model.

Figure 7:
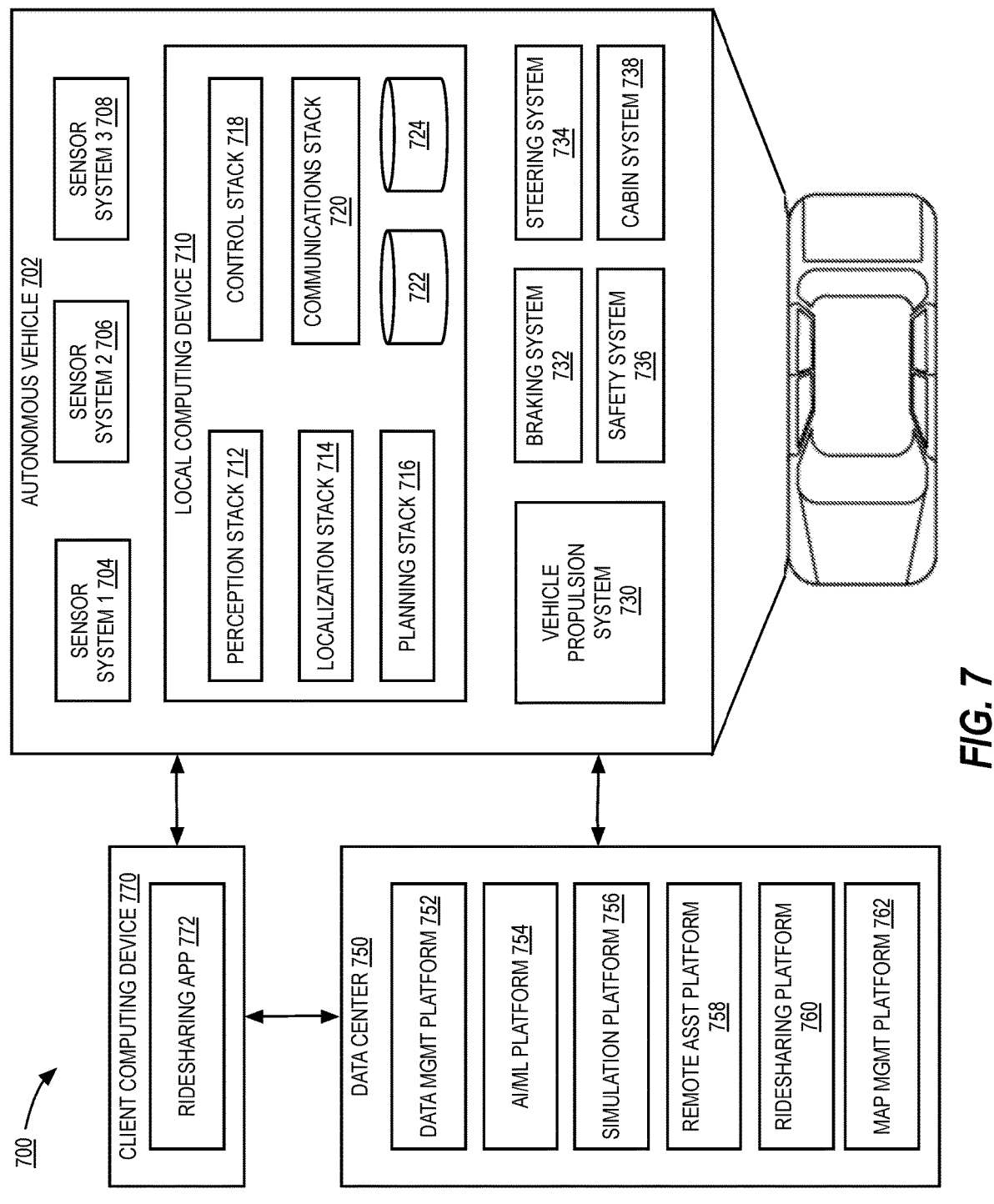
FIG. 7 illustrates an example system environment that can be used to facilitate AV dispatch and operations, according to some aspects of the disclosed technology.

Turning now to FIG. 7, this figure illustrates an example of an AV management system 700. In one embodiment, the AV management system 700 can implement right-of-way-based semantic coverage and automatic labeling for trajectory generation in autonomous systems, as described further herein. One of ordinary skill in the art will understand that, for the AV management system 700 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 700 includes an AV 702, a data center 750, and a client computing device 770. The AV 702, the data center 750, and the client computing device 770 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 702 can navigate about roadways without a human driver based on sensor signals generated by multiple sensor systems 704, 706, and 708. The sensor systems 704-708 can include different types of sensors and can be arranged about the AV 702. For instance, the sensor systems 704-708 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 704 can be a camera system, the sensor system 706 can be a LIDAR system, and the sensor system 708 can be a RADAR system. Other embodiments may include any other number and type of sensors.

AV 702 can also include several mechanical systems that can be used to maneuver or operate AV 702. For instance, the mechanical systems can include vehicle propulsion system 730, braking system 732, steering system 734, safety system 736, and cabin system 738, among other systems. Vehicle propulsion system 730 can include an electric motor, an internal combustion engine, or both. The braking system 732 can include an engine brake, a wheel braking system (e.g., a disc braking system that utilizes brake pads), hydraulics, actuators, and/or any other suitable componentry configured to assist in decelerating AV 702. The steering system 734 can include suitable componentry configured to control the direction of movement of the AV 702 during navigation. Safety system 736 can include lights and signal indicators, a parking brake, airbags, and so forth. The cabin system 738 can include cabin temperature control systems, in-cabin entertainment systems, and so forth. In some embodiments, the AV 702 may not include human driver actuators (e.g., steering wheel, handbrake, foot brake pedal, foot accelerator pedal, turn signal lever, window wipers, etc.) for controlling the AV 702. Instead, the cabin system 738 can include one or more client interfaces (e.g., Graphical User Interfaces (GUIs), Voice User Interfaces (VUIs), etc.) for controlling certain aspects of the mechanical systems 730-738.

AV 702 can additionally include a local computing device 710 that is in communication with the sensor systems 704-708, the mechanical systems 730-738, the data center 750, and the client computing device 770, among other systems. The local computing device 710 can include one or more processors and memory, including instructions that can be executed by the one or more processors. The instructions can make up one or more software stacks or components responsible for controlling the AV 702; communicating with the data center 750, the client computing device 770, and other systems; receiving inputs from riders, passengers, and other entities within the AV's environment; logging metrics collected by the sensor systems 704-708; and so forth. In this example, the local computing device 710 includes a perception stack 712, a mapping and localization stack 714, a planning stack 716, a control stack 718, a communications stack 720, a High Definition (HD) geospatial database 722, and an AV operational database 724, among other stacks and systems.

Perception stack 712 can enable the AV 702 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 704-708, the mapping and localization stack 714, the HD geospatial database 722, other components of the AV, and other data sources (e.g., the data center 750, the client computing device 770, third-party data sources, etc.). The perception stack 712 can detect and classify objects and determine their current and predicted locations, speeds, directions, and the like. In addition, the perception stack 712 can determine the free space around the AV 702 (e.g., to maintain a safe distance from other objects, change lanes, park the AV, etc.). The perception stack 712 can also identify environmental uncertainties, such as where to look for moving objects, flag areas that may be obscured or blocked from view, and so forth.

Mapping and localization stack 714 can determine the AV's position and orientation (pose) using different methods from multiple systems (e.g., GPS, IMUs, cameras, LIDAR, RADAR, ultrasonic sensors, the HD geospatial database 722, etc.). For example, in some embodiments, the AV 702 can compare sensor data captured in real-time by the sensor systems 704-708 to data in the HD geospatial database 722 to determine its precise (e.g., accurate to the order of a few centimeters or less) position and orientation. The AV 702 can focus its search based on sensor data from one or more first sensor systems (e.g., GPS) by matching sensor data from one or more second sensor systems (e.g., LIDAR). If the mapping and localization information from one system is unavailable, the AV 702 can use mapping and localization information from a redundant system and/or from remote data sources.

The planning stack 716 can determine how to maneuver or operate the AV 702 safely and efficiently in its environment. For example, the planning stack 716 can receive the location, speed, and direction of the AV 702, geospatial data, data regarding objects sharing the road with the AV 702 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 702 from one point to another. The planning stack 716 can determine multiple sets of one or more mechanical operations that the AV 702 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 716 can select from multiple backup plans to carry out. For example, while preparing to change lanes to turn right at an intersection, another vehicle may aggressively cut into the destination lane, making the lane change unsafe. The planning stack 716 could have already determined an alternative plan for such an event, and upon its occurrence, help to direct the AV 702 to go around the block instead of blocking a current lane while waiting for an opening to change lanes.

The control stack 718 can manage the operation of the vehicle propulsion system 730, the braking system 732, the steering system 734, the safety system 736, and the cabin system 738. The control stack 718 can receive sensor signals from the sensor systems 704-708 as well as communicate with other stacks or components of the local computing device 710 or a remote system (e.g., the data center 750) to effectuate operation of the AV 702. For example, the control stack 718 can implement the final path or actions from the multiple paths or actions provided by the planning stack 716. This can involve turning the routes and decisions from the planning stack 716 into commands for the actuators that control the AV's steering, throttle, brake, and drive unit.

The communication stack 720 can transmit and receive signals between the various stacks and other components of the AV 702 and between the AV 702, the data center 750, the client computing device 770, and other remote systems. The communication stack 720 can enable the local computing device 710 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 720 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 722 can store HD maps and related data of the streets upon which the AV 702 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 724 can store raw AV data generated by the sensor systems 704-708 and other components of the AV 702 and/or data received by the AV 702 from remote systems (e.g., the data center 750, the client computing device 770, etc.). In some embodiments, the raw AV data can include HD LIDAR point cloud data, image or video data, RADAR data, GPS data, and other sensor data that the data center 750 can use for creating or updating AV geospatial data as discussed further below with respect to FIG. 8 and elsewhere in the present disclosure.

The data center 750 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 750 can include one or more computing devices remote to the local computing device 710 for managing a fleet of AVs and AV-related services. For example, in addition to managing the AV 702, the data center 750 may also support a ridesharing service, a delivery service, a remote/roadside assistance service, street services (e.g., street mapping, street patrol, street cleaning, street metering, parking reservation, etc.), and the like.

The data center 750 can send and receive various signals to and from the AV 702 and the client computing device 770. These signals can include sensor data captured by the sensor systems 704-708, roadside assistance requests, software updates, ridesharing pick-up and drop-off instructions, and so forth. In this example, the data center 750 includes one or more of a data management platform 752, an Artificial Intelligence/Machine Learning (AI/ML) platform 754, a simulation platform 756, a remote assistance platform 758, a ridesharing platform 760, and a map management platform 762, among other systems.

Data management platform 752 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 750 can access data stored by the data management platform 752 to provide their respective services.

The AI/ML platform 754 can provide the infrastructure for training and evaluating machine learning algorithms for operating the AV 702, the simulation platform 756, the remote assistance platform 758, the ridesharing platform 760, the map management platform 762, and other platforms and systems. Using the AI/ML platform 754, data scientists can prepare data sets from the data management platform 752; select, design, and train machine learning models; evaluate, refine, and deploy the models; maintain, monitor, and retrain the models; and so on.

The simulation platform 756 can enable testing and validation of the algorithms, machine learning models, neural networks, and other development efforts for the AV 702, the remote assistance platform 758, the ridesharing platform 760, the map management platform 762, and other platforms and systems. The simulation platform 756 can replicate a variety of driving environments and/or reproduce real-world scenarios from data captured by the AV 702, including rendering geospatial information and road infrastructure (e.g., streets, lanes, crosswalks, traffic lights, stop signs, etc.) obtained from the map management platform 762; modeling the behavior of other vehicles, bicycles, pedestrians, and other dynamic elements; simulating inclement weather conditions, different traffic scenarios; and so on.

The remote assistance platform 758 can generate and transmit instructions regarding the operation of the AV 702. For example, in response to an output of the AI/ML platform 754 or other system of the data center 750, the remote assistance platform 758 can prepare instructions for one or more stacks or other components of the AV 702.

The ridesharing platform 760 can interact with a customer of a ridesharing service via a ridesharing application 772 executing on the client computing device 770. The client computing device 770 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 772. The client computing device 770 can be a customer's mobile computing device or a computing device integrated with the AV 702 (e.g., the local computing device 710). The ridesharing platform 760 can receive requests to be picked up or dropped off from the ridesharing application 772 and dispatch the AV 702 for the trip.

Map management platform 762 can provide a set of tools for the manipulation and management of geographic and spatial (geospatial) and related attribute data. The data management platform 752 can receive LIDAR point cloud data, image data (e.g., still image, video, etc.), RADAR data, GPS data, and other sensor data (e.g., raw data) from one or more AVs 702, Unmanned Aerial Vehicles (UAVs), satellites, third-party mapping services, and other sources of geospatially referenced data. The raw data can be processed, and map management platform 762 can render base representations (e.g., tiles (2D), bounding volumes (3D), etc.) of the AV geospatial data to enable users to view, query, label, edit, and otherwise interact with the data. Map management platform 762 can manage workflows and tasks for operating on the AV geospatial data. Map management platform 762 can control access to the AV geospatial data, including granting or limiting access to the AV geospatial data based on user-based, role-based, group-based, task-based, and other attribute-based access control mechanisms. Map management platform 762 can provide version control for the AV geospatial data, such as to track specific changes that (human or machine) map editors have made to the data and to revert changes. Map management platform 762 can administer release management of the AV geospatial data, including distributing suitable iterations of the data to different users, computing devices, AVs, and other consumers of HD maps. Map management platform 762 can provide analytics regarding the AV geospatial data and related data, such as to generate insights relating to the throughput and quality of mapping tasks.

In some embodiments, the map viewing services of map management platform 762 can be modularized and deployed as part of one or more of the platforms and systems of the data center 750. For example, the AI/ML platform 754 may incorporate the map viewing services for visualizing the effectiveness of various object detection or object classification models, the simulation platform 756 may incorporate the map viewing services for recreating and visualizing certain driving scenarios, the remote assistance platform 758 may incorporate the map viewing services for replaying traffic incidents to facilitate and coordinate aid, the ridesharing platform 760 may incorporate the map viewing services into the client application 772 to enable passengers to view the AV 702 in transit en route to a pick-up or drop-off location, and so on.

Figure 8:
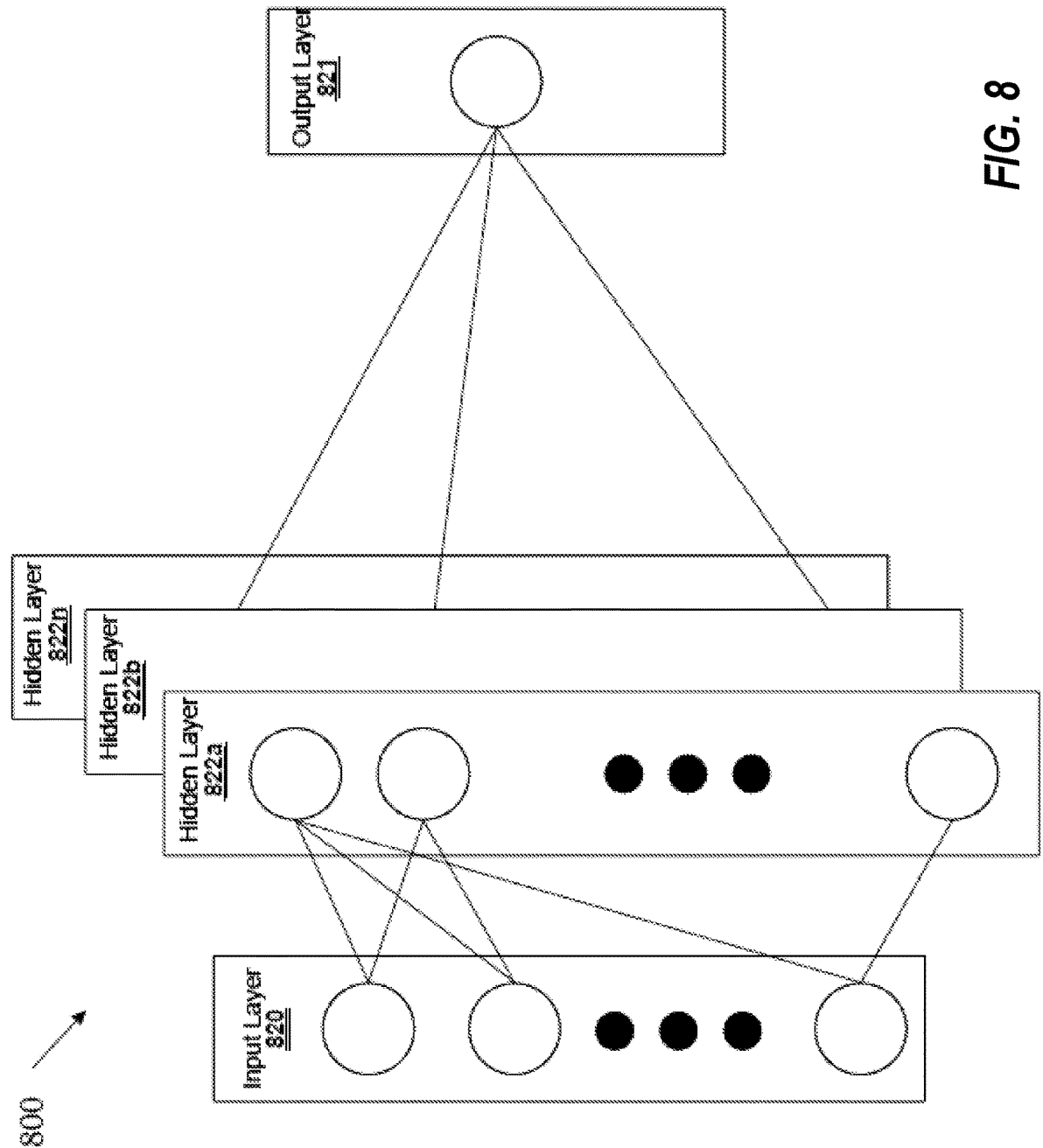
FIG. 8 illustrates an example of a deep learning neural network that can be used to implement a perception module and/or one or more validation modules, according to some aspects of the disclosed technology.

In FIG. 8, the disclosure now turns to a further discussion of models that can be used through the environments and techniques described herein. Specifically, FIG. 8 is an illustrative example of a deep learning neural network 800 that can be used to implement all or a portion of a perception module (or perception system) as discussed above. An input layer 820 can be configured to receive sensor data and/or data relating to an environment surrounding an AV. The neural network 800 includes multiple hidden layers 822a, 822b, through 822n. The hidden layers 822a, 822b, through 822n include "n" number of hidden layers, where "n" is an integer greater than or equal to one. The number of hidden layers can be made to include as many layers for the given application. The neural network 800 further includes an output layer 821 that provides an output resulting from the processing performed by the hidden layers 822a, 822b, through 822n. In one illustrative example, the output layer 821 can provide estimated treatment parameters, that can be used/ingested by a differential simulator to estimate a patient treatment outcome.

The neural network 800 is a multi-layer neural network of interconnected nodes. Each node can represent a piece of information. Information associated with the nodes is shared among the different layers and each layer retains information as information is processed. In some cases, the neural network 800 can include a feed-forward network, in which case there are no feedback connections where outputs of the network are fed back into itself. In some cases, the neural network 800 can include a recurrent neural network, which can have loops that allow information to be carried across nodes while reading in input.

Information can be exchanged between nodes through node-to-node interconnections between the various layers. Nodes of the input layer 820 can activate a set of nodes in the first hidden layer 822a. For example, as shown, each of the input nodes of the input layer 820 is connected to each of the nodes of the first hidden layer 822a. The nodes of the first hidden layer 822a can transform the information of each input node by applying activation functions to the input node information. The information derived from the transformation can then be passed to and can activate the nodes of the next hidden layer 822b, which can perform their own designated functions. Example functions include convolutional, up-sampling, data transformation, and/or any other suitable functions. The output of the hidden layer 822b can then activate nodes of the next hidden layer, and so on. The output of the last hidden layer 822n can activate one or more nodes of the output layer 821, at which an output is provided. In some cases, while nodes in the neural network 800 are shown as having multiple output lines, a node can have a single output and all lines shown as being output from a node represent the same output value.

In some cases, each node or interconnection between nodes can have a weight that is a set of parameters derived from the training of the neural network 800. Once the neural network 800 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 800 to be adaptive to inputs and able to learn as more and more data is processed.

The neural network 800 is pre-trained to process the features from the data in the input layer 820 using the different hidden layers 822a, 822b, through 822n in order to provide the output through the output layer 821.

In some cases, the neural network 800 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 800 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total=\Sigma(\frac{1}{2}(target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 800 can perform a backward pass by determining which inputs (weights) most contributed to the loss of the network, and can adjust the weights so that the loss decreases and is eventually minimized.

The neural network 800 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 800 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 9:
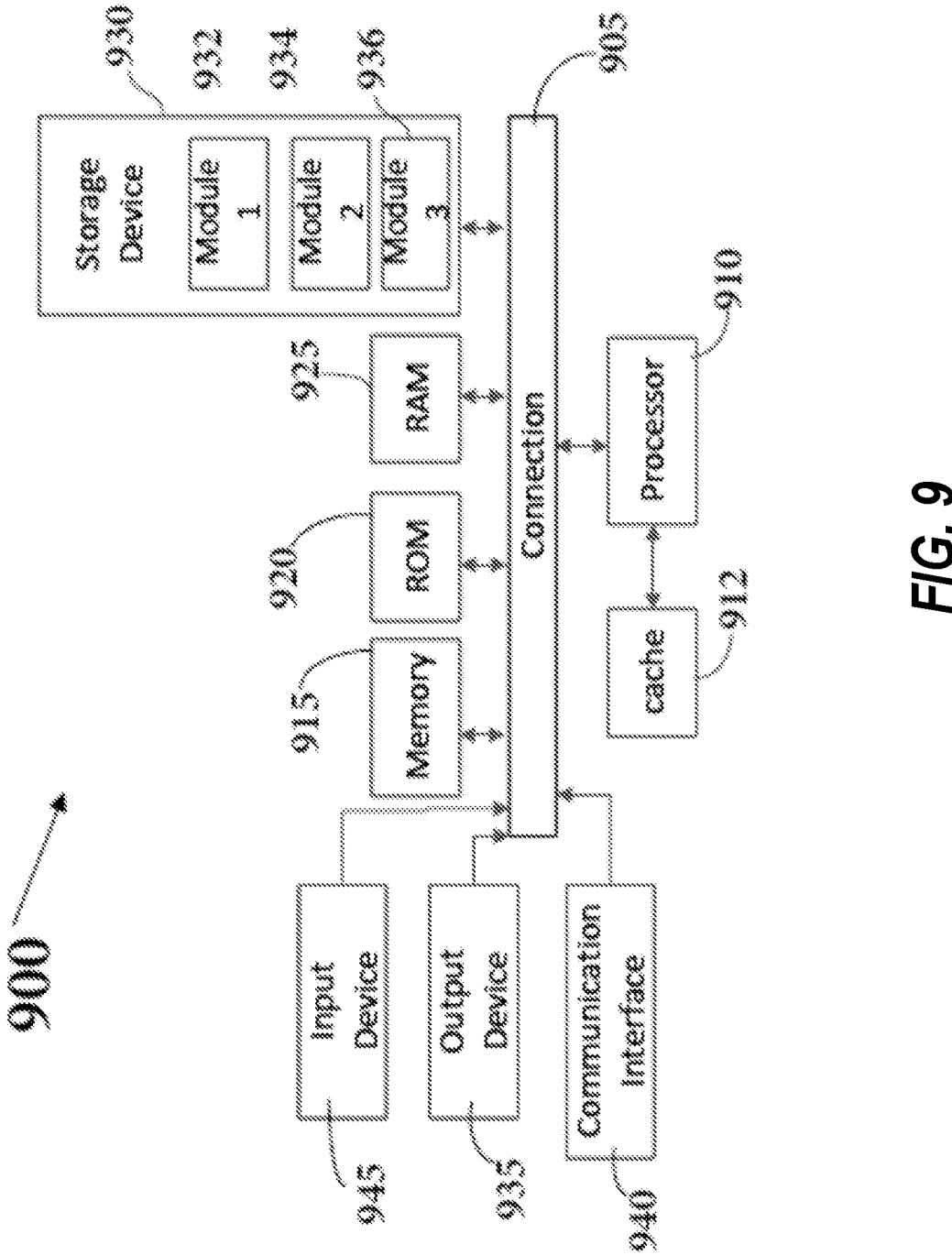
FIG. 9 illustrates an example processor-based system with which some aspects of the subject technology can be implemented.

FIG. 9 illustrates an example processor-based system with which some aspects of the subject technology can be implemented. For example, processor-based system 900 can be any computing device making up, or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (Central Processing Unit (CPU) or processor) 910 and connection 905 that couples various system components including system memory 915, such as Read-Only Memory (ROM) 920 and Random-Access Memory (RAM) 925 to processor 910. Computing system 900 can include a cache of high-speed memory 912 connected directly with, in close proximity to, or integrated as part of processor 910.

Processor 910 can include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 930 can include software services, servers, services, etc., that when the code that defines such software is executed by the processor 910, it causes the system 900 to perform a function. In some embodiments, a hardware service that performs a particular function can include the software component stored in a computer-readable medium in connection with the hardware components, such as processor 910, connection 905, output device 935, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 includes a computer-implemented method for facilitating right-of-way-based semantic coverage and automatic labeling for trajectory generation in autonomous systems, where the method comprises receiving a set of trajectories generated by at least one trajectory generation source, the set of trajectories generated for a scene having an autonomous vehicle (AV) interaction with a road agent; labeling a ground truth trajectory from the set of trajectories with a ground truth label; classifying each remaining trajectory of the set of trajectories as at least one of an assert trajectory or a yield trajectory; for an assert group comprising the assert trajectories, assigning an auxiliary assert label to the assert trajectory having a highest selection score from a trajectory selection source; for a yield group comprising the yield trajectories, assigning an auxiliary yield label to the yield trajectory having a highest selection score from the trajectory selection source; and utilizing the ground truth label, the auxiliary assert label, and the auxiliary yield label to train a trajectory generation model, wherein training of the trajectory generation model comprises using mode selectors corresponding to each label to provide secondary supervision trajectories when computing a loss for the trajectory generation model.

In Example 2, the subject matter of Example 1 can optionally include wherein the AV interaction comprises at least one of an overtake interaction or a commit interaction. In Example 3, the subject matter of any one of Examples 1-2 can optionally include wherein the at least one trajectory generation source comprises a trajectory generation model, a heuristics generation source, or a non-convex solver and costing source. In Example 4, the subject matter of any one of Examples 1-3 can optionally include wherein classifying each trajectory of the set of trajectories as at least one of the assert trajectory or the yield trajectory further comprises comparing each trajectory to set of assert/yield metrics comprising at least one a speed difference between an AV and the road agent or determination of whether the AV or the road agent arrives to a commit region first.

In Example 5, the subject matter of any one of Examples 1-4 can optionally include wherein the trajectory selection source comprises a trajectory selection model. In Example 6, the subject matter of any one of Examples 1-5 can optionally include wherein the mode selectors select a candidate trajectory from a set of candidate training trajectories that is closest to the label corresponding to the mode selector. In Example 7, the subject matter of any one of Examples 1-6 can optionally include wherein an individual weighted Huber loss is computed for each selected candidate trajectory, and wherein the individual weighted Huber losses are combined to generate a final combined loss for training of the trajectory generation model.

In Example 8, the subject matter of any one of Examples 1-7 can optionally include further comprising: receiving a collection of generated trajectories from an ML model; classifying a trajectory of the collection of generated trajectories as an assert trajectory classification responsive to the trajectory satisfying a set of assert definition metrics; classifying a trajectory of the collection of generated trajectories as a yield trajectory classification responsive to the trajectory satisfying a set of yield definition metrics; and determining a right-of-way-based semantic mode coverage metric based on the assert trajectory classifications and the yield trajectory classifications as compared to a total number of the generated trajectories in the collection. In Example 9, the subject matter of any one of Examples 1-8 can optionally include wherein the right-of-way-based semantic mode coverage metric comprises at least one of a percentage of assert trajectory classifications and yield trajectory classifications, respectively, within the collection or identifying whether there is at least one of each assert trajectory classification and yield trajectory classification in the collection of generated trajectories per each AV interaction.

Example 10 includes an apparatus for facilitating right-of-way-based semantic coverage and automatic labeling for trajectory generation in autonomous systems, the apparatus of Example 10 comprising one or more hardware processors to: receive a set of trajectories generated by at least one trajectory generation source, the set of trajectories generated for a scene having an autonomous vehicle (AV) interaction with a road agent; label a ground truth trajectory from the set of trajectories with a ground truth label; classify each remaining trajectory of the set of trajectories as at least one of an assert trajectory or a yield trajectory; for an assert group comprising the assert trajectories, assign an auxiliary assert label to the assert trajectory having a highest selection score from a trajectory selection source; for a yield group comprising the yield trajectories, assign an auxiliary yield label to the yield trajectory having a highest selection score from the trajectory selection source; and utilize the ground truth label, the auxiliary assert label, and the auxiliary yield label to train a trajectory generation model, wherein training of the trajectory generation model comprises using mode selectors corresponding to each label to provide secondary supervision trajectories when computing a loss for the trajectory generation model.

In Example 11, the subject matter of Example 10 can optionally include wherein the AV interaction comprises at least one of an overtake interaction or a commit interaction. In Example 12, the subject matter of Examples 10-11 can optionally include wherein the one or more processors to classify each trajectory of the set of trajectories as at least one of the assert trajectory or the yield trajectory further comprises the one or more processors to compare each trajectory to set of assert/yield metrics comprising at least one a speed difference between an AV and the road agent or determination of whether the AV or the road agent arrives to a commit region first.

In Example 13, the subject matter of Examples 10-12 can optionally include wherein the mode selectors select a candidate trajectory from a set of candidate training trajectories that is closest to the label corresponding to the mode selector. In Example 14, the subject matter of Examples 10-13 can optionally include wherein an individual weighted Huber loss is computed for each selected candidate trajectory, and wherein the individual weighted Huber losses are combined to generate a final combined loss for training of the trajectory generation model.

In Example 15, the subject matter of Examples 10-14 can optionally include wherein the one or more processors are further to: receive a collection of generated trajectories from an ML model; classify a trajectory of the collection of generated trajectories as an assert trajectory classification responsive to the trajectory satisfying a set of assert definition metrics; classify a trajectory of the collection of generated trajectories as a yield trajectory classification responsive to the trajectory satisfying a set of yield definition metrics; and determine a right-of-way-based semantic mode coverage metric based on the assert trajectory classifications and the yield trajectory classifications as compared to a total number of the generated trajectories in the collection.

Example 16 is a non-transitory computer-readable storage medium for facilitating right-of-way-based semantic coverage and automatic labeling for trajectory generation in autonomous systems. The non-transitory computer-readable storage medium of Example 16 having stored thereon executable computer program instructions that, when executed by one or more processors, cause the one or more processors to: receive a set of trajectories generated by at least one trajectory generation source, the set of trajectories generated for a scene having an autonomous vehicle (AV) interaction with a road agent; label a ground truth trajectory from the set of trajectories with a ground truth label; classify each remaining trajectory of the set of trajectories as at least one of an assert trajectory or a yield trajectory; for an assert group comprising the assert trajectories, assign an auxiliary assert label to the assert trajectory having a highest selection score from a trajectory selection source; for a yield group comprising the yield trajectories, assign an auxiliary yield label to the yield trajectory having a highest selection score from the trajectory selection source; and utilize the ground truth label, the auxiliary assert label, and the auxiliary yield label to train a trajectory generation model, wherein training of the trajectory generation model comprises using mode selectors corresponding to each label to provide secondary supervision trajectories when computing a loss for the trajectory generation model.

In Example 17, the subject matter of Example 16 can optionally include wherein the AV interaction comprises at least one of an overtake interaction or a commit interaction. In Example 18, the subject matter of Examples 16-17 can optionally include wherein the one or more processors to classify each trajectory of the set of trajectories as at least one of the assert trajectory or the yield trajectory further comprises the one or more processors to compare each trajectory to set of assert/yield metrics comprising at least one a speed difference between an AV and the road agent or determination of whether the AV or the road agent arrives to a commit region first. In Example 19, the subject matter of Examples 16-18 can optionally include wherein the mode selectors select a candidate trajectory from a set of candidate training trajectories that is closest to the label corresponding to the mode selector, and wherein an individual weighted Huber loss is computed for each selected candidate trajectory, and wherein the individual weighted Huber losses are combined to generate a final combined loss for training of the trajectory generation model.

In Example 20, the subject matter of Examples 16-19 can optionally include wherein the one or more processors are further to: receive a collection of generated trajectories from an ML model; classify a trajectory of the collection of generated trajectories as an assert trajectory classification responsive to the trajectory satisfying a set of assert definition metrics; classify a trajectory of the collection of generated trajectories as a yield trajectory classification responsive to the trajectory satisfying a set of yield definition metrics; and determine a right-of-way-based semantic mode coverage metric based on the assert trajectory classifications and the yield trajectory classifications as compared to a total number of the generated trajectories in the collection.

Example 21 is a system for facilitating right-of-way-based semantic coverage and automatic labeling for trajectory generation in autonomous systems. The system of Example 21 can optionally include a memory to store a block of data, and one or more hardware processors to: receive a set of trajectories generated by at least one trajectory generation source, the set of trajectories generated for a scene having an autonomous vehicle (AV) interaction with a road agent; label a ground truth trajectory from the set of trajectories with a ground truth label; classify each remaining trajectory of the set of trajectories as at least one of an assert trajectory or a yield trajectory; for an assert group comprising the assert trajectories, assign an auxiliary assert label to the assert trajectory having a highest selection score from a trajectory selection source; for a yield group comprising the yield trajectories, assign an auxiliary yield label to the yield trajectory having a highest selection score from the trajectory selection source; and utilize the ground truth label, the auxiliary assert label, and the auxiliary yield label to train a trajectory generation model, wherein training of the trajectory generation model comprises using mode selectors corresponding to each label to provide secondary supervision trajectories when computing a loss for the trajectory generation model.

In Example 22, the subject matter of Example 21 can optionally include wherein the AV interaction comprises at least one of an overtake interaction or a commit interaction. In Example 23, the subject matter of Examples 21-22 can optionally include wherein the one or more processors to classify each trajectory of the set of trajectories as at least one of the assert trajectory or the yield trajectory further comprises the one or more processors to compare each trajectory to set of assert/yield metrics comprising at least one a speed difference between an AV and the road agent or determination of whether the AV or the road agent arrives to a commit region first.

In Example 24, the subject matter of Examples 21-23 can optionally include wherein the mode selectors select a candidate trajectory from a set of candidate training trajectories that is closest to the label corresponding to the mode selector. In Example 25, the subject matter of Examples 21-24 can optionally include wherein an individual weighted Huber loss is computed for each selected candidate trajectory, and wherein the individual weighted Huber losses are combined to generate a final combined loss for training of the trajectory generation model.

In Example 26, the subject matter of Examples 21-25 can optionally include wherein the one or more processors are further to: receive a collection of generated trajectories from an ML model; classify a trajectory of the collection of generated trajectories as an assert trajectory classification responsive to the trajectory satisfying a set of assert definition metrics; classify a trajectory of the collection of generated trajectories as a yield trajectory classification responsive to the trajectory satisfying a set of yield definition metrics; and determine a right-of-way-based semantic mode coverage metric based on the assert trajectory classifications and the yield trajectory classifications as compared to a total number of the generated trajectories in the collection.

Example 27 includes an apparatus comprising means for performing the method of any of the Examples 1-9. Example 28 is at least one machine readable medium comprising a plurality of instructions that in response to being executed on a computing device, cause the computing device to carry out a method according to any one of Examples 1-9. Example 29 is an apparatus for facilitating right-of-way-based semantic coverage and automatic labeling for trajectory generation in autonomous systems, configured to perform the method of any one of Examples 1-9. Specifics in the Examples may be used anywhere in one or more embodiments.

The various embodiments described above are provided by way of illustration and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method comprising:
    receiving a set of trajectories generated by at least one trajectory generation source, the set of trajectories generated for a scene having an autonomous vehicle (AV) interaction with a road agent;
    labeling a ground truth trajectory from the set of trajectories with a ground truth label; classifying each remaining trajectory of the set of trajectories as at least one of an assert trajectory or a yield trajectory;
    for an assert group comprising the assert trajectories, assigning an auxiliary assert label to an assert trajectory having a highest selection score from a trajectory selection source;
    for a yield group comprising the yield trajectories, assigning an auxiliary yield label to a yield trajectory having a highest selection score from the trajectory selection source; and
    utilizing the ground truth label, the auxiliary assert label, and the auxiliary yield label to train a trajectory generation model, wherein training of the trajectory generation model comprises using mode selectors corresponding to each label to provide secondary supervision trajectories when computing a loss for the trajectory generation model.

2. The computer-implemented method of claim 1, wherein the AV interaction comprises at least one of an overtake interaction or a commit interaction.

3. The computer-implemented method of claim 1, wherein the at least one trajectory generation source comprises the trajectory generation model, a heuristics generation source, or a non-convex solver and costing source.

4. The computer-implemented method of claim 1, wherein classifying each remaining trajectory of the set of trajectories as at least one of the assert trajectory or the yield trajectory further comprises comparing each trajectory to set of assert metrics or yield metrics comprising at least one of a speed difference between an AV and the road agent or determination of whether the AV or the road agent arrives to a commit region first.

5. The computer-implemented method of claim 1, wherein the trajectory selection source comprises a trajectory selection model.

6. The computer-implemented method of claim 1, wherein the mode selectors select a candidate trajectory from a set of candidate training trajectories that is closest to a label corresponding to a mode selector.

7. The computer-implemented method of claim 6, wherein an individual weighted Huber loss is computed for each selected candidate trajectory, and wherein individual weighted Huber losses are combined to generate a final combined loss for training of the trajectory generation model.

8. The computer-implemented method of claim 1, further comprising:
    receiving a collection of generated trajectories from a machine learning model;
    classifying a trajectory of the collection of generated trajectories as an assert trajectory classification responsive to the trajectory satisfying a set of assert definition metrics;
    classifying a trajectory of the collection of generated trajectories as a yield trajectory classification responsive to the trajectory satisfying a set of yield definition metrics; and
    determining a right-of-way-based semantic mode coverage metric based on assert trajectory classifications and yield trajectory classifications as compared to a total number of the generated trajectories in the collection.

9. The computer-implemented method of claim 8, wherein the right-of-way-based semantic mode coverage metric comprises at least one of a percentage of the assert trajectory classifications and the yield trajectory classifications, respectively, within the collection of generated trajectories or identifying whether there is at least one of each assert trajectory classification and yield trajectory classification in the collection of generated trajectories per each AV interaction.

10. An apparatus comprising:
    one or more hardware processors to:
        receive a set of trajectories generated by at least one trajectory generation source, the set of trajectories generated for a scene having an autonomous vehicle (AV) interaction with a road agent;
        label a ground truth trajectory from the set of trajectories with a ground truth label;
        classify each remaining trajectory of the set of trajectories as at least one of an assert trajectory or a yield trajectory;
        for an assert group comprising the assert trajectories, assign an auxiliary assert label to an assert trajectory having a highest selection score from a trajectory selection source;
        for a yield group comprising the yield trajectories, assign an auxiliary yield label to a yield trajectory having a highest selection score from the trajectory selection source; and
        utilize the ground truth label, the auxiliary assert label, and the auxiliary yield label to train a trajectory generation model, wherein training of the trajectory generation model comprises using mode selectors corresponding to each label to provide secondary supervision trajectories when computing a loss for the trajectory generation model.

11. The apparatus of claim 10, wherein the AV interaction comprises at least one of an overtake interaction or a commit interaction.

12. The apparatus of claim 10, wherein the one or more processors to classify each remaining trajectory of the set of trajectories as at least one of the assert trajectory or the yield trajectory further comprises the one or more processors to compare each remaining trajectory to set of assert metrics or yield metrics comprising at least one of a speed difference between an AV and the road agent or determination of whether the AV or the road agent arrives to a commit region first.

13. The apparatus of claim 10, wherein the mode selectors select a candidate trajectory from a set of candidate training trajectories that is closest to a label corresponding to a mode selector.

14. The apparatus of claim 13, wherein an individual weighted Huber loss is computed for each selected candidate trajectory, and wherein individual weighted Huber losses are combined to generate a final combined loss for training of the trajectory generation model.

15. The apparatus of claim 10, wherein the one or more processors are further to:

receive a collection of generated trajectories from a machine learning model;

classify a trajectory of the collection of generated trajectories as an assert trajectory classification responsive to the trajectory satisfying a set of assert definition metrics;

classify a trajectory of the collection of generated trajectories as a yield trajectory classification responsive to the trajectory satisfying a set of yield definition metrics; and determine a right-of-way-based semantic mode coverage metric based on assert trajectory classifications and yield trajectory classifications as compared to a total number of the generated trajectories in the collection.

16. A non-transitory computer-readable medium having stored thereon instructions that, when executed by one or more processors, cause the one or more processors to:

receive a set of trajectories generated by at least one trajectory generation source, the set of trajectories generated for a scene having an autonomous vehicle (AV) interaction with a road agent;

label a ground truth trajectory from the set of trajectories with a ground truth label;

classify each remaining trajectory of the set of trajectories as at least one of an assert trajectory or a yield trajectory;

for an assert group comprising the assert trajectories, assign an auxiliary assert label to an assert trajectory having a highest selection score from a trajectory selection source;

for a yield group comprising the yield trajectories, assign an auxiliary yield label to a yield trajectory having a highest selection score from the trajectory selection source; and utilize the ground truth label, the auxiliary assert label, and the auxiliary yield label to train a trajectory gen-eration model, wherein training of the trajectory gen-eration model comprises using mode selectors corre-sponding to each label to provide secondary supervision trajectories when computing a loss for the trajectory generation model.

17. The non-transitory computer-readable medium of claim 16, wherein the AV interaction comprises at least one of an overtake interaction or a commit interaction.

18. The non-transitory computer-readable medium of claim 16, wherein the one or more processors to classify each remaining trajectory of the set of trajectories as at least one of the assert trajectory or the yield trajectory further comprises the one or more processors to compare each trajectory to set of assert/yield metrics or yield metrics comprising at least one of a speed difference between an AV and the road agent or determination of whether the AV or the road agent arrives to a commit region first.

19. The non-transitory computer-readable medium of claim 16, wherein the mode selectors select a candidate trajectory from a set of candidate training trajectories that is closest to a label corresponding to a mode selector, and wherein an individual weighted Huber loss is computed for each selected candidate trajectory, and wherein individual weighted Huber losses are combined to generate a final combined loss for training of the trajectory generation model.

20. The non-transitory computer-readable medium of claim 16, wherein the one or more processors are further to:

receive a collection of generated trajectories from a machine learning model;

classify a trajectory of the collection of generated trajectories as an assert trajectory classification responsive to the trajectory satisfying a set of assert definition metrics;

classify a trajectory of the collection of generated trajectories as a yield trajectory classification responsive to the trajectory satisfying a set of yield definition metrics; and determine a right-of-way-based semantic mode coverage metric based on assert trajectory classifications and yield trajectory classifications as compared to a total number of the generated trajectories in the collection.

* * * * *